United States Patent [19]

Ito et al.

[11] Patent Number: 5,505,606

[45] Date of Patent: Apr. 9, 1996

[54] NOZZLE HOLE SEALING DEVICE FOR INJECTION NOZZLE

[75] Inventors: Susumu Ito; Katsuyuki Yamanaka, both of Minamitsuru; Akira Kouketsu, Komaki; Kazunari Ijima, Minamitsuru, all of Japan

[73] Assignee: Fanuc Ltd., Yamanashi, Japan

[21] Appl. No.: 190,120

[22] PCT Filed: Jun. 4, 1993

[86] PCT No.: PCT/JP93/00757

§ 371 Date: Feb. 3, 1994

§ 102(e) Date: Feb. 3, 1994

[87] PCT Pub. No.: WO93/25369

PCT Pub. Date: Dec. 23, 1993

[30] Foreign Application Priority Data

Jun. 17, 1992 [JP] Japan ..................... 4-181575

[51] Int. Cl.⁶ ..................................................... B29C 45/00
[52] U.S. Cl. ........................... 425/225; 264/39; 425/226; 425/562
[58] Field of Search .................... 425/190, 225, 425/226, 562, 563, 564, 567; 264/39

[56] References Cited

U.S. PATENT DOCUMENTS 4,416,605  11/1983  Konno et al. .................... 264/39
4,808,355  2/1989  Kamiyama et al. .................... 425/226
4,952,132  8/1990  Lundquist .................... 425/562
5,281,374  1/1994  Matsuda et al. .................... 425/225

FOREIGN PATENT DOCUMENTS 59007026  1/1984  Japan .

OTHER PUBLICATIONS

Hackh's Chemical Dictionary, 1969, p. 674.

Primary Examiner—Tim Heitbrink
Attorney, Agent, or Firm—Staas & Halsey

[57] ABSTRACT

A nozzle hole sealing device for an injection nozzle capable of blocking a hole at the tip of a nozzle by using a robot in purging an injection molding machine. The nozzle hole sealing device includes a tool changer for connecting the nozzle hole sealing device to a wrist of the robot and a nozzle sealing body for sealing a nozzle hole by contacting the nozzle tip of the injection molding machine, thereby composing a nozzle sealing robot tool as a whole. A chuck mechanism for keeping a nozzle tip in contact with the nozzle sealing body, a heat reserving heater for a nozzle tip contact portion, and a resin passage ranging from the nozzle tip contact portion to a purged resin discharge surface including a constant pressure open value disposed in the middle of the passage may be further included.

16 Claims, 9 Drawing Sheets

NOZZLE HOLE SEALING DEVICE FOR INJECTION NOZZLE

BACKGROUND OF THE INVENTION

1. Field of the Invention

The present invention relates to a nozzle hole sealing device for an injection nozzle, which is located between a nozzle of an injection molding machine and a tool used by a robot which is combined with the injection molding machine.

2. Description of the Related Art

In a highly automated injection molding system, a robot is combined with an injection molding machine to let it perform the change of core, the unloading of a product, and the opening/closing of a gate. For this purpose, various tools are made available, and changed by attaching to and detaching from the wrist of an arm end of the robot.

On the other hand, the injection molding machine undergoes a purging process when changing a resin or color. In order for the purging to be performed efficiently by changing the resin all over the screw, however, it is preferable to initially seal the nozzle hole at the nozzle tip, apply a back pressure on the screw, and perform the measuring operation for purging while increasing the resin density. Conventionally, however, a tool for a robot designed for use in blocking the nozzle hole at the nozzle tip of injection molding machine in purging has not been available. Therefore, something like a shutter used to be placed between the fixing platen and the nozzle (Japanese Unexamined Patent Publication No. S63-185617), or a shut-off nozzle has been used. Those methods, however, have some limitations such that the space for placing the blocking tool and that the usable resins are limited. Moreover despite the fact that a robot is capable of performing various works, a separate device is needed only for purging to entail an extra cost.

SUMMARY OF THE INVENTION

An object of the present invention is to provide a nozzle sealing device capable of blocking a nozzle hole using a robot in purging an injection molding machine.

To achieve the above object, in one mode of the present invention, a robot tool is constituted so that a nozzle sealing body having a nozzle contact area formed on one side of the body and capable of sealing a hole of a nozzle disposed at the distal end of a heating cylinder by pressing the nozzle contact area against the nozzle hole can be mounted on a robot wrist via a tool changer.

Further, in another mode of the present invention, a robot tool is constituted so that a nozzle sealing body having a nozzle contact area formed on one side of the body and capable of sealing a hole of a nozzle disposed at the distal end of a heating cylinder by pressing the nozzle contact area against the nozzle hole can be mounted on a robot wrist via a tool changer, the nozzle sealing body being provided with an engagement mechanism for engaging the body with the nozzle or the heating cylinder, and the outer surface of the nozzle or the heating cylinder being provided with a recessed or protecting portion to engage with the engagement mechanism.

Preferably, the engagement mechanism comprises a plurality of chuck claws capable of being opened/closed by power supplied from the robot side, and an engagement groove for accommodating to the chuck claws is formed in the nozzle or the heating cylinder.

Further, in still another mode of the present invention, a robot tool is constituted so that a connected body formed at the distal end of a shaft member and comprising a flat-board-shaped nozzle sealing body, having a nozzle contact area extending in the axial direction and formed on the inner surface of the body, and a guide body, opposing to the nozzle contact area and having a space between the guide body and the nozzle contact area increasing toward the distal end, is mounted to a robot wrist via a tool changer, the guide body having a recess for accommodating a nozzle or a heating cylinder, and, on the other hand, a guide flange, having an inclined surface to engage with the inner flat surface of the guide body, is formed on the outer surface of the nozzle or the heating cylinder, so that, when the shaft member is moved toward the heating cylinder in the axial direction to accommodate the nozzle or the heating cylinder into the recess of the guide body, a hole of the nozzle disposed at the distal end of the heating cylinder is sealed by the nozzle contact area on the inner surface of the nozzle sealing body, and the guide body engages with the guide flange, whereby the position of the nozzle sealing body can be maintained with respect to the heating cylinder.

Further, in still another mode, a robot tool is constituted so that a connected body formed at the distal end of a shaft member and comprising a flat-board-shaped nozzle sealing body, having a nozzle contact area extending in the axial direction and formed on the inner surface of the body, and a pair of gripping jaws, opposing to each other with a gap provided between the jaws and the nozzle sealing body, is mounted on a robot wrist via a tool changer, the gripping jaws being able to be opened/closed by power supplied from the robot side, and, on the other hand, a guide flange with a predetermined width having an inclined surface in the the direction of its width is formed on the outer surface of the nozzle or the heating cylinder, so that, when the gripping jaws are driven to grasp the guide flange after the shaft member is moved toward the heating cylinder in the axial direction while the gripping jaws are kept open, the gripping jaws come in contact with the inclined surface of the guide flange formed on the outer surface of the nozzle or the heating cylinder; consequently, the nozzle contact area of the nozzle sealing body is moved toward a hole at the nozzle tip to press the hole against the nozzle contact area.

Further, in still another mode, a cylindrical nozzle sealing body, having a nozzle contact area formed at the bottom thereof and internal threads formed on the inside thereof is pivotally mounted on a robot tool mounted on a robot wrist through a tool changer so as to be rotated by power supplied from the robot side, and a heating cylinder of an injection molding machine or a nozzle installed thereto has external threads formed to engage with the internal threads on the nozzle sealing body, so that, when the nozzle sealing body is rotated after the robot tool is moved toward the nozzle in the axial direction of the nozzle sealing body, the internal threads of the nozzle sealing body engage with the external threads on the nozzle or the heating cylinder, by which the nozzle sealing body is pulled toward the nozzle, whereby a hole at the nozzle tip is sealed by the nozzle contact area at the cylinder bottom of the nozzle sealing body.

Further, in still another mode, a nozzle sealing body, which passes through a robot tool body and can slide with respect thereto, is disposed to the robot tool body mounted on a robot wrist via a tool changer; a sealing portion including a nozzle contact surface formed on the outer surface thereof for sealing a hole at the nozzle tip is disposed at one end of the nozzle sealing body; a contact member which is to be in contact with a stationary platen or metallic mold is disposed at the other end of the nozzle sealing body; and a spring is disposed between the robot tool body and the nozzle sealing body to energize the nozzle sealing body toward the nozzle side with respect to the robot tool body, so that when the nozzle is moved toward the stationary platen or the metallic mold after the nozzle sealing body is put between the nozzle and the stationary platen or the metallic mold, the contact member disposed on the nozzle sealing body comes in contact with the stationary platen or the metallic mold as the sealing portion disposed on the nozzle sealing body is pressed by the nozzle, and the nozzle sealing body is energized toward the nozzle tip side by the action of the spring, whereby the nozzle contact surface formed on the nozzle sealing body seals the hole at the nozzle tip.

Preferably, the nozzle contact area as a part of the nozzle sealing body consists of a concave having a roundness whose radius of the curvature with respect to its center, which is to coincide with the nozzle hole, is slightly larger than the radius of the roundness of the nozzle tip.

Preferably, the nozzle sealing body is connected to the tool changer via a buffering member made of an elastic material.

Preferably, the nozzle sealing body is made of heat-resistant rigid plastic.

Preferably, the robot tool body is provided with a resin receiver for receiving purged resin discharged from the hole at the nozzle tip.

Preferably, a heat reserving heater is disposed inside the nozzle sealing body in the vicinity of the nozzle contact area formed in the nozzle sealing body.

Preferably, the nozzle sealing body is provided with a resin passage formed therein and having an inlet port opening to the nozzle contact area formed on one side surface of the nozzle sealing body and a discharge port opening to the lower end surface of the nozzle sealing body.

Preferably, a constant pressure open valve is disposed inside the nozzle sealing body, more specifically in the middle of the resin passage.

Preferably, a heater for heating the resin passage is disposed inside the nozzle sealing body.

As described above, according to the present invention, the nozzle hole can be blocked by the robot in purging the injection molded machine, an example in which a robot is highly utilized in the injection molding system. Further, there is no need for installing a nozzle sealing device on the injection molding machine, so that the injection molding machine can be constructed simply. Also, there is no need for adding a special construction to the injection molding machine for automation.

DETAILED DESCRIPTION OF THE PREFERRED EMBODIMENT

Figure 1:
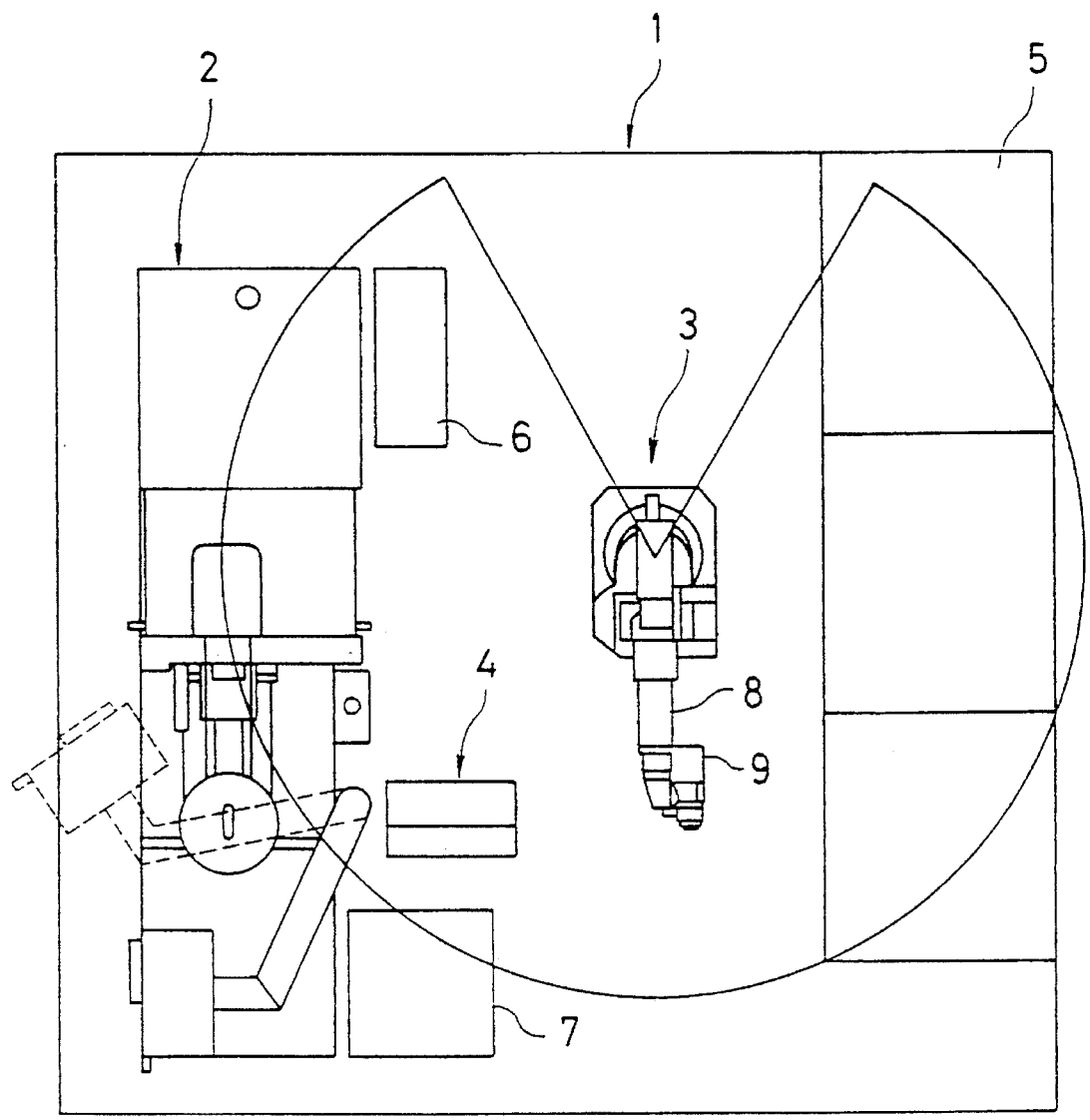
FIG. 1 is a plan view of an injection molding device in which a robot having a nozzle hole sealing device of the present invention is attached to the wrist thereof is mounted in the vicinity of the injection molding machine.

Referring to FIG. 1, an injection molding system 1 comprises an injection molding machine 2, a robot 3, a core and tool stocker 4, and a product stocker 5. Reference numeral 6 denotes a metallic mold temperature regulator, and 7 denotes a resin dryer. On the core and tool stocker 4, cores and tools (hands) corresponding to various works are stocked at predetermined positions.

The robot 3 is located between the injection molding machine 2 and the product stocker 5. The zone in which the wrist 9 at the end of the arm 8 of the robot 3 can operate is a sectorial area surrounded by an arc and radiuses in FIG. 1. The robot 3 selects a tool from among the tools stocked on the core and tool stocker 4 in accordance with a molding program and mounts it to the wrist 9 thereof to perform opening/closing of gate, change of core, and unloading of product for the injection molding machine 2. The 5 robot 3 also carries, classifies, and stocks the product for the product stocker 5. The tool is changed via the wrist 9 and a tool changer provided to each tool. The tool, after being used, is correctly returned to the predetermined position on the core and tool stocker 4.

Figure 2:
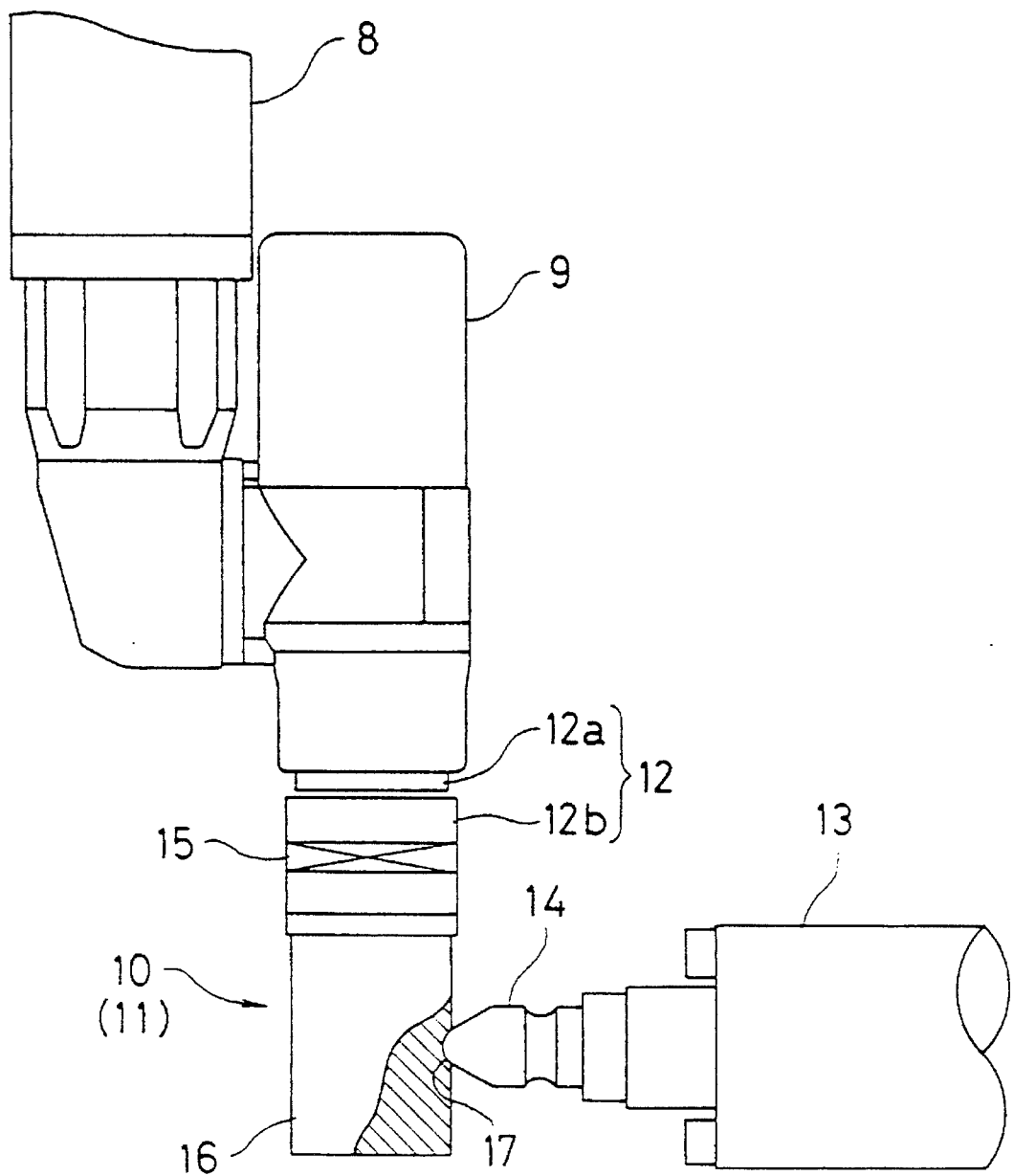
FIG. 2 is a front view of a main part of the nozzle hole sealing device in accordance with the first embodiment of the present invention.

Referring now to FIG. 2, the nozzle hole sealing device 10 in accordance with the first embodiment of the present invention includes of a robot tool 11 only. The robot tool 11 for sealing nozzle, which is one of the tools stocked on the core and tool stocker 4, is mounted on the wrist 9 at the end of the arm 8 of the robot 3 via the tool changer 12(a, b). In FIG. 2, reference numeral 14 denotes a nozzle mounted at the distal end of a heating cylinder 13.

The nozzle sealing robot tool 11, which includes the nozzle hole sealing device 10, is mounted on the tool changer 12b on the wrist 9 of the robot 3 via a buffering portion 15 of a rubber disc. The nozzle sealing body 16 is made of heat-resistant rigid plastic, at the front of which is formed a concave portion 17 with a roundness having a larger radius than that of the nozzle tip.

When the injection molding machine 2 is set to the purging mode, and the injection molding machine 2 releases nozzle touch, the injection unit is retracted, so that a gap is formed between the fixing platen and the nozzle tip. The robot 3 changes its tool for the robot tool 11 for sealing nozzle, and moves the tool 11 into the gap. Then, the robot 3 pushes the concave portion 17 on the nozzle sealing body 16 against the tip of the nozzle 14. At this time, some shock or slight positional shift, occurring when the nozzle sealing body 16 collides with the nozzle 14, is absorbed by the deformation of the buffering portion 15. However, the deformation of the buffering portion 15 is so small that a sufficient pushing force can be applied between the tip of the nozzle 14 and the nozzle sealing body 16. Further, the aforesaid concave portion 17 has an aligning function such as to guide the tip of the nozzle 14 to the correct position.

Thus, the nozzle hole 18 (refer to FIG. 7) at the tip of the nozzle 14 is temporarily blocked by the nozzle sealing body 16. This causes the injection molding machine 2 to perform a resin measuring operation for purging according to the operation completion (sealing completion) signal sent from the robot 3. The resin to be measured is melted by kneading and heating in a barrel, and is sent forward (nozzle side), and, since the nozzle hole is blocked, the resin remains in a heating cylinder to cause the back pressure of resin to increase. As a result, the resin which has been used in the previous molding operation and is remaining on the inner surface of the heating cylinder and on a screw is thoroughly replaced by the resin for purging.

This back pressure, which is about 50–100 kg/cm$^2$ and varies depending on the types of the resin to be replaced and the resin for purging, can sufficiently be sustained by the rigidity of the arm 8 of the robot 3, because the radius of the nozzle hole 18 is not so large. After the measuring operation has been performed under a predetermined back pressure for a predetermined time, the nozzle sealing robot tool 11 is dismounted from the nozzle tip, and stands by at a position at a short distance from the nozzle tip. Then, the injecting operation takes place, causing the resin in a cylinder assembly 13 to be discharged through the nozzle hole 18 (the discharge pressure is usually 1000 kg/cm$^2$ or higher). In the purging mode of the injection molding machine 2, this operation is repeated several times until the resin, which has been used in the previous molding operation, is removed completely. After the purging is completed, the nozzle sealing robot tool 11 is returned to the core and tool stocker 4.

Figure 3:
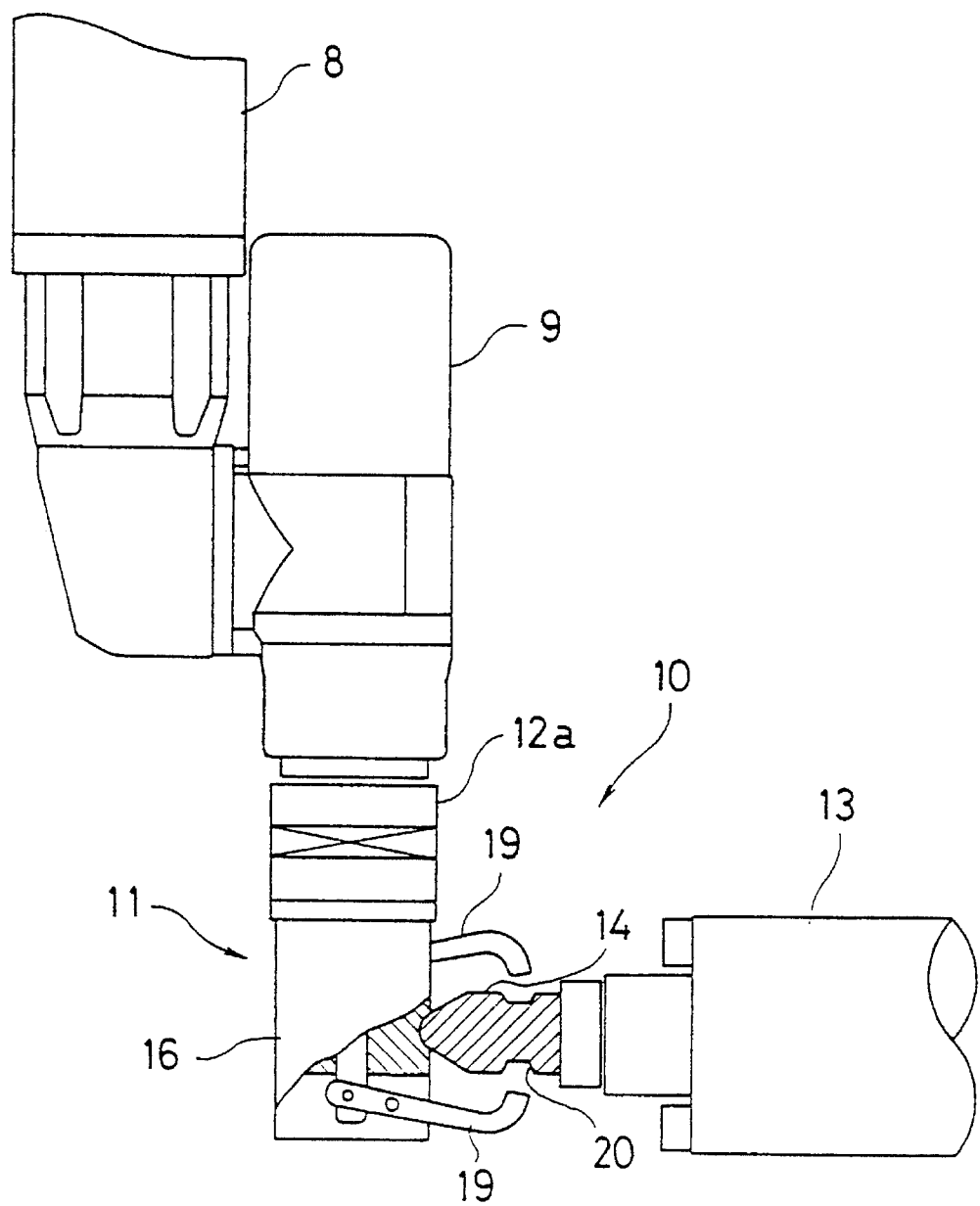
FIG. 3 is a front view, partially in cross section, of a main part of the nozzle sealing device in accordance with the second embodiment of the present invention.
Figure 4:
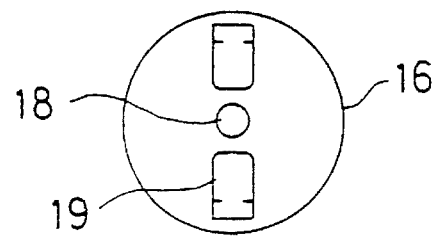
FIG. 4 is a side view of a nozzle hole sealing body on the nozzle hole sealing device in accordance with the second embodiment-of the present invention.
Figure 5:
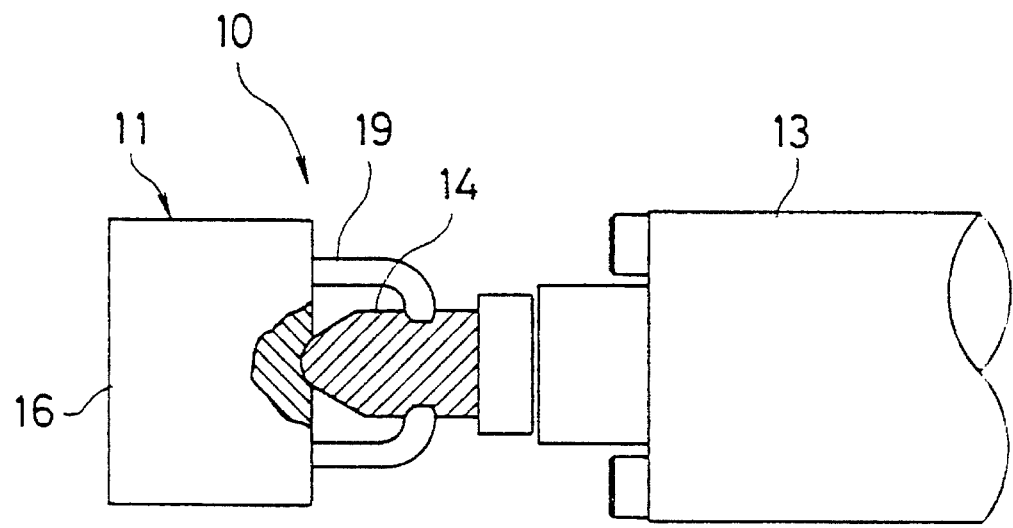
FIG. 5 is a front view, partially in cross section, of a main part of the nozzle hole sealing device in accordance with the second embodiment of the present invention.

FIGS. 3 through 5 show the second embodiment of the present invention. The nozzle hole sealing device 10 of this embodiment is characterized by a chuck mechanism installed on the side of the nozzle sealing robot tool 11. This chuck mechanism has two chuck claws 19 disposed opposite to each other for being capable of opening and closing so that the tip of the claw 19 fits in an engagement groove 20 formed on the side of the nozzle 14. The shape of the engagement groove 20 is such that when the claw 19 goes into the engagement groove 20, the nozzle 14 is attracted to the nozzle sealing body 16 by the inclined surface on the inner side of the claw tip moving along the front inclined wall of the engagement groove 20.

The chuck claw 19 is opened/closed by power (rotational force produced by air or a motor) transmitted from the robot 3 via the tool changer 12. The chuck claw 19 is preferably composed of a plurality 10 of claws, for example three claws, which are designed to sustain equal forces respectively.

The nozzle hole sealing device 10 of the second embodiment comprises the nozzle sealing robot tool 11 and the engagement groove 20 on the nozzle side as shown in FIG. 2. According to this embodiment, the condition, in which the nozzle tip is in contact with the nozzle sealing body 16, is maintained by the chuck mechanism to lessen the load on the arm 8 of the robot 3. When the resin for purging is discharged, the chuck claws 19 are disengaged from the engagement groove 20 to release the nozzle sealing body 16 from the nozzle tip.

Figure 6:
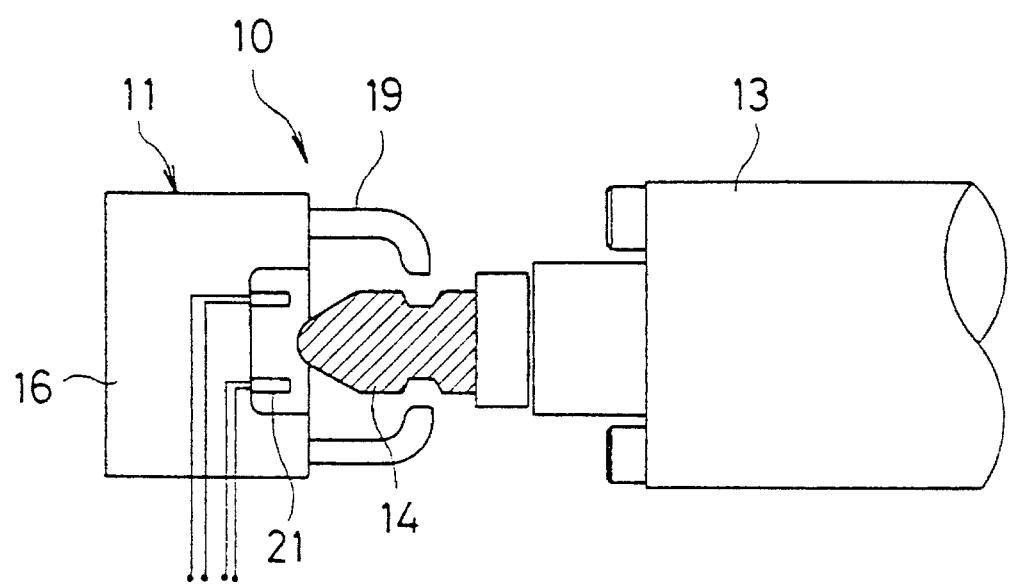
FIG. 6 is a front view, partially in cross section, of a main part of the nozzle hole sealing device in accordance with the third embodiment of the present invention.

FIG. 6 shows the third embodiment of the present invention. The nozzle hole sealing device 10 of this embodiment is characterized by heat reserving heaters 21 arranged at the portion to which the nozzle tip abuts on the nozzle sealing body 16. Such a construction enables melting or softening of sealed resin during the time when the nozzle tip is in contact with the nozzle sealing body 16 even if the nozzle hole 18 is blocked by solidified resin. Therefore, the resin can be discharged smoothly in the purging operation. As a result, the highly automated injection molding operation is not interrupted.

Figure 7:
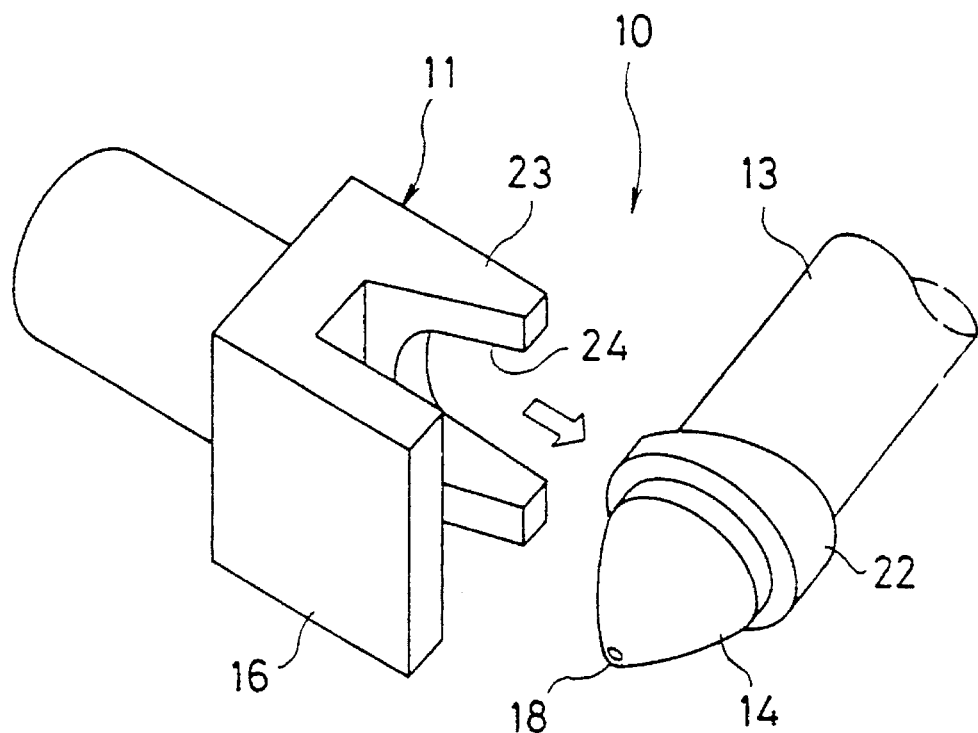
FIG. 7 is a perspective view of a main part of the nozzle hole sealing device in accordance with the fourth embodiment of the present invention.
Figure 8:
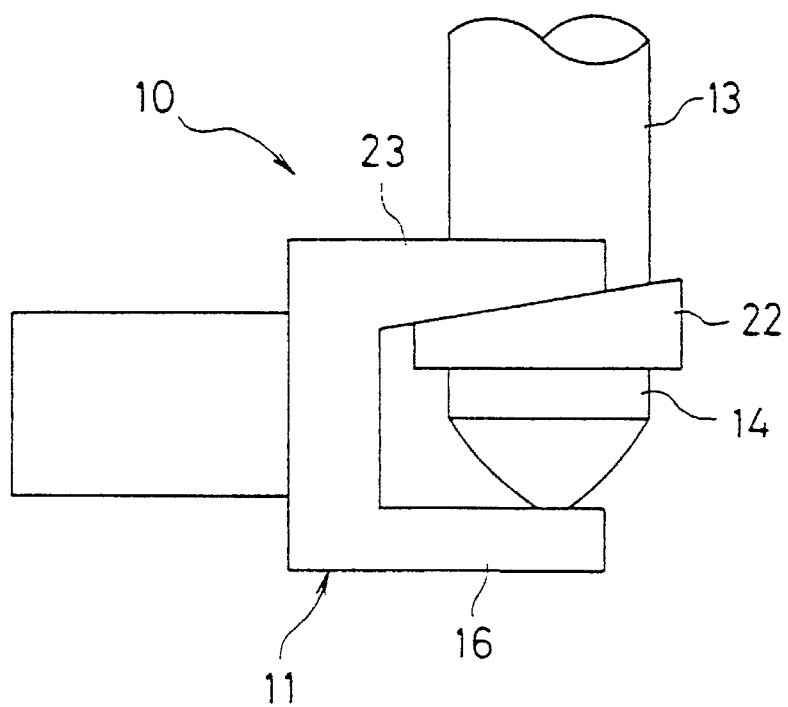
FIG. 8 is a front view of a main part of the nozzle hole sealing device in accordance with the present invention.

FIGS. 7 and 8 show the fourth embodiment of the present invention. The nozzle hole sealing device 10 of this embodiment comprises the nozzle sealing robot tool 11 and a guide flange 22 which is formed on the nozzle and has a transversely (axial direction of the aforesaid tool 11) inclined surface. As seen from these figures, the nozzle sealing robot tool 11 includes a nozzle sealing body 16 and a guide body 23 which are formed integrally with a space interposed therebetween along the longitudinal direction of the nozzle. The guide body has a transversely inclined inner surface and also has a recess 24 for accommodating the cylindrical portion of the nozzle 14.

When the nozzle sealing robot tool 11 is moved toward the nozzle 14 by the robot 3, the nozzle 14 enters the recess 24 of the guide body 23 so that the guide flange 22 engages with the guide body 23 along their inclined surfaces. Before completion of the engagement, there is a gap between the tip of the nozzle 14 and the inner surface of the nozzle sealing body 16. As the nozzle sealing robot tool 11 advances with respect to the nozzle 14, this gap is reduced, and finally the nozzle hole 18 is blocked by the inner surface of the nozzle sealing body 16.

According to this embodiment, the nozzle hole 18 can surely be sealed, and the sealing can be maintained without using movable parts like the chuck mechanism. When discharging the resin for purging, the nozzle tip is released from the nozzle sealing body 16.

Figure 9:
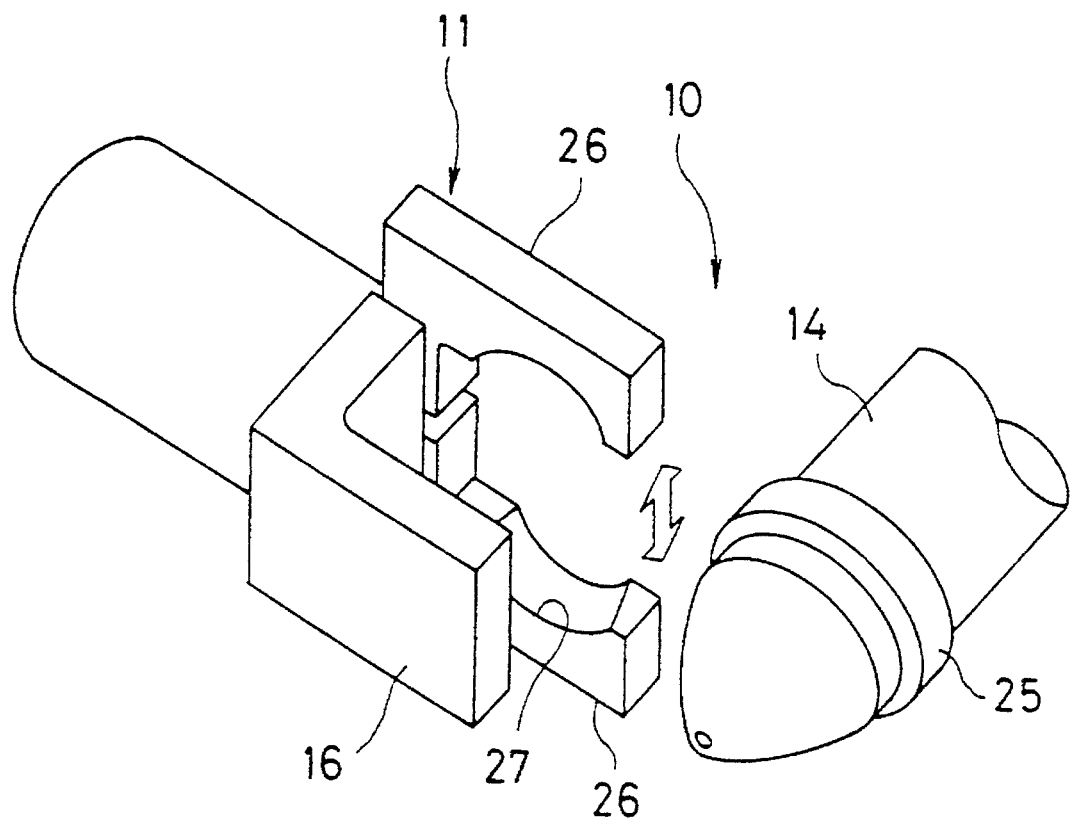
FIG. 9 is a perspective view of a main part of the nozzle hole sealing device in accordance with the fifth embodiment of the present invention.
Figure 10:
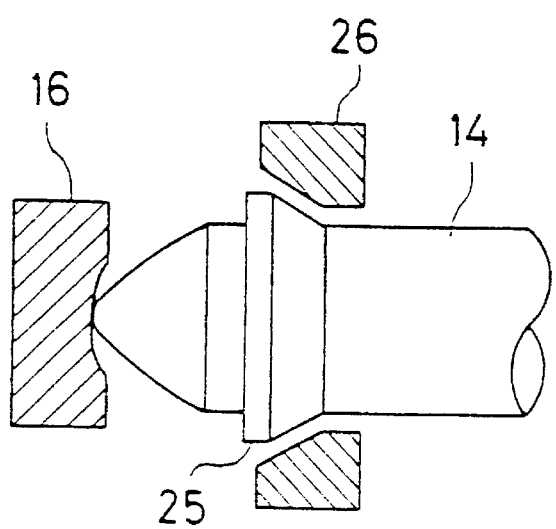
FIG. 10 is a front view, partially in cross section, of a main part of the nozzle hole sealing device in accordance with the fifth embodiment of the present invention.

FIGS. 9 and 10 show the fifth embodiment of the present invention. The nozzle hole sealing device 10 of this embodiment is characterized in that the nozzle sealing robot tool 11 includes a nozzle sealing body 16 and a pair of gripping jaws 26, 26, which can be driven for opening and closing in a vertical direction as they are disposed with a space provided therebetween in the longitudinal direction, while a guide flange 25 having a surface inclined with respect to the direction of the movement of the nozzle (axial direction of the nozzle) is formed on the side of the nozzle. The upper and lower gripping jaws 26 respectively have a concave portion 27 on their opposing surfaces, which grasps the portion of the nozzle 14 ranging from the cylindrical portion to the aforesaid guide flange 25. The inner surface of the gripping jaw is inclined with respect to the direction of the movement of the nozzle.

The nozzle sealing robot tool 11 is moved toward the nozzle 14 by the robot 3, so that the nozzle tip approaches the inner surface of the nozzle sealing body 16, and the cylindrical portion of the nozzle 14 is located between the gripping jaws 26. Then, the aforesaid guide flange 25 is grasped by the upper and lower gripping jaws 28 and 28 by moving the gripping jaws in the direction such that they come close to each other. As a result, the inclined surfaces of the guide flange 25 engage with the inclined surfaces of the gripping jaws 28, whereby the nozzle hole 18 is blocked by being pressed against the inner surface of the nozzle sealing body 16.

According to the fifth embodiment, when mounting the nozzle sealing robot tool 11 on the cylinder assembly 13 of the injection molding machine 2 by the robot 3, no side force acts on the cylinder assembly 13; therefore, no load is applied to the mounting portion of the cylinder assembly 13 on which the nozzle sealing robot is mounted. When the resin for purging is discharged, the nozzle tip is separated from the nozzle sealing body 16.

Figure 11:
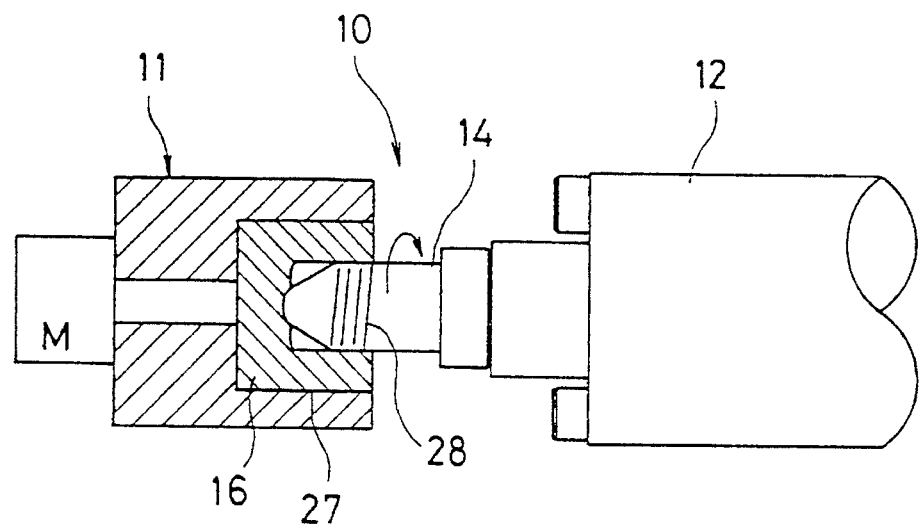
FIG. 11 is a front view, partially in cross section, of a main part of the nozzle hole sealing device in accordance with the sixth embodiment of the present invention.

FIG. 11 shows the sixth embodiment of the present invention. The nozzle hole sealing device 10 of this embodiment comprises a nozzle sealing robot tool 11, to which an internally-threaded body 27 to be rotated by a motor M is pivotally mounted, and an externally-threaded portion 28 formed along the periphery of the tip portion of the nozzle 14. The internally-threaded body 27, which is a cylinder with a bottom, and the bottom constitutes the nozzle sealing body 16 and is opens rearwardly.

The nozzle sealing robot tool 11 of this embodiment is moved to the front of the nozzle 14 by the robot 3, and its opening is slided over the tip of the nozzle 14 while rotating the internally-threaded body 27 by means of the motor M. The threaded engagement between the internal threads and the external threads brings the tip of the nozzle 14 into contact with the nozzle sealing body 16, thereby blocking the nozzle hole 18. Thus, the contact between the nozzle sealing body 16 and the nozzle tip can securely be maintained. Moreover, the constitution for this purpose can be achieved relatively easily.

When discharging the resin for purging, the nozzle 14 is released by driving the motor M in the direction reverse to the aforesaid direction. Then, the nozzle hole sealing device 10 is separated from the nozzle 14 by the robot 3.

Figure 12:
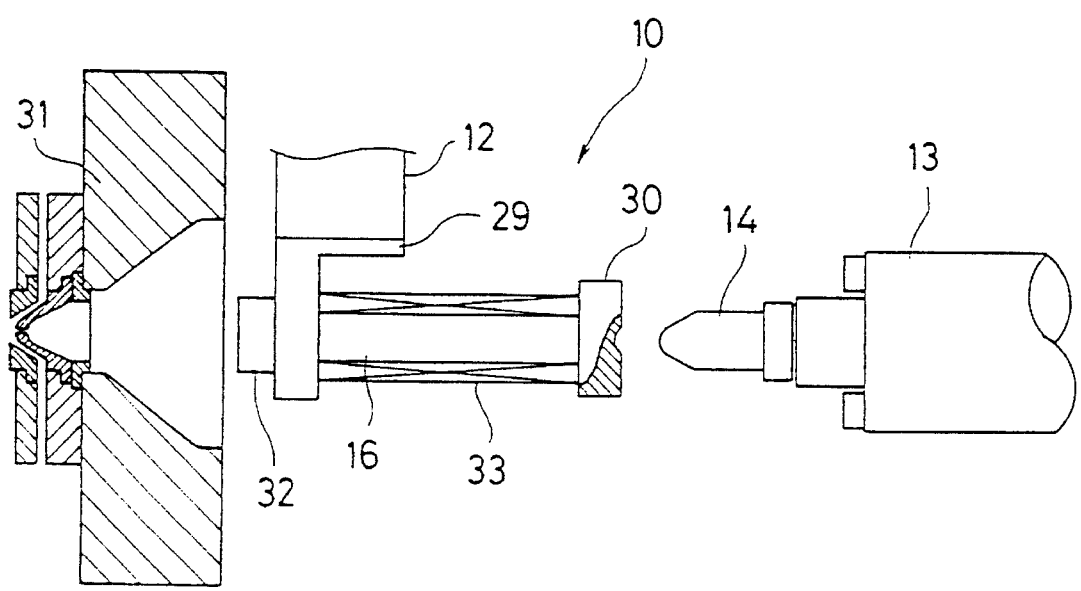
FIG. 12 is a front view, partially in cross section, of a main part of the nozzle hole sealing device in accordance with the seventh embodiment of the present invention.
Figure 13:
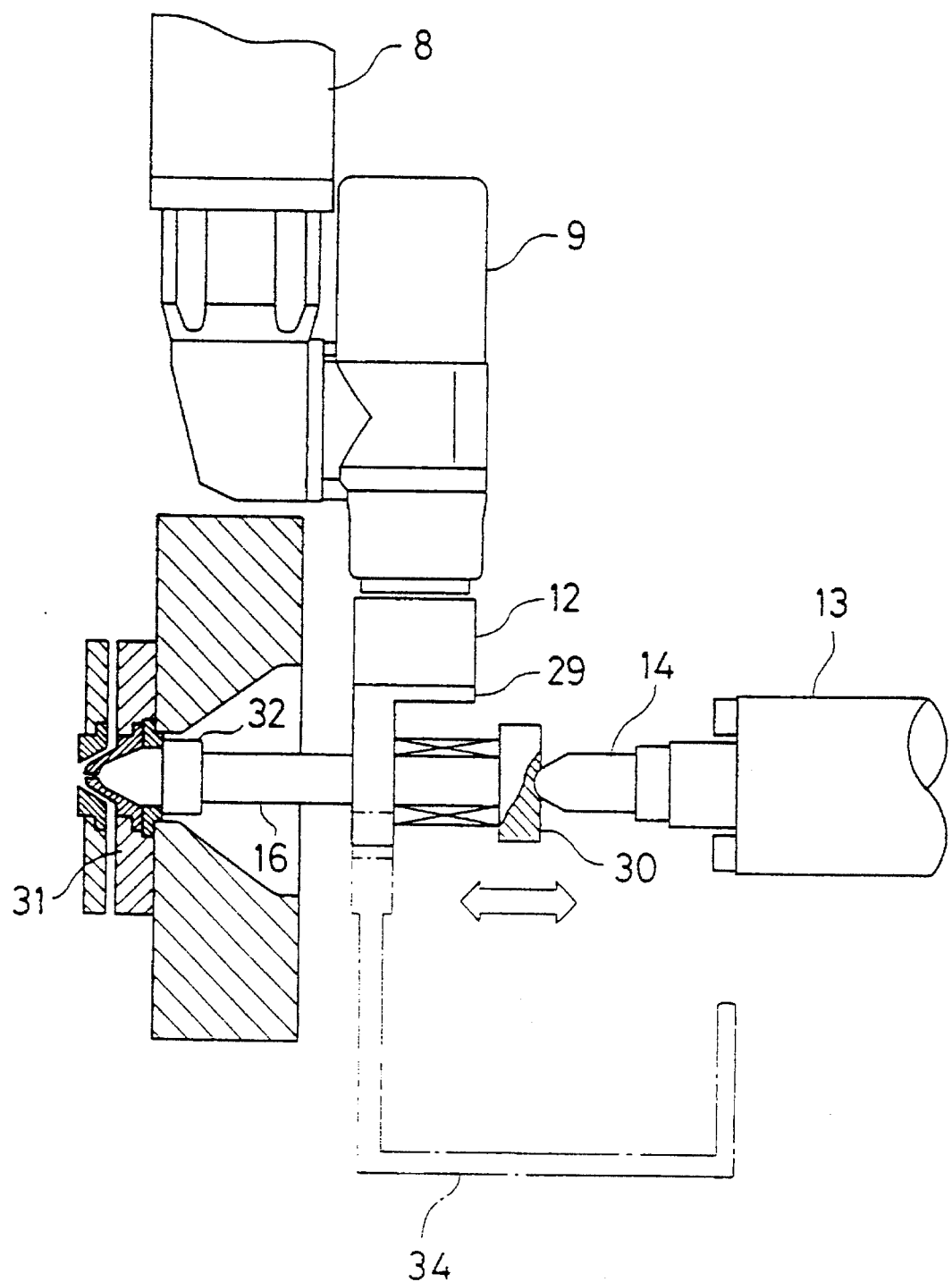
FIG. 13 is also a front view, partially in cross section, of a main part of the nozzle hole sealing device in accordance with the seventh embodiment of the present invention.

FIGS. 12 and 13 show the seventh embodiment of the present invention. The nozzle hole sealing device 10 of this embodiment comprises a body 29 having a tool changer 12, to be connected to the wrist 9 of the robot 3, and a nozzle sealing body 16 which slidably passes through the body 29. The nozzle sealing body 16 is cylindrical as a with, whose one end constituting a nozzle sealing surface 30, and the other end constituting a supporting surface 32 which comes in contact with a mold clamping unit member 31 (stationary platen, or metallic mold). The nozzle sealing surface 30 is formed into a flange shape, and a return spring 33 is mounted between the nozzle sealing surface 30 and the body 29 to return the nozzle sealing surface 30 to the original position.

In this embodiment, the robot 3 merely locates the nozzle hole sealing device 10 between the tip of the nozzle 14 and the mold clamping unit member 31. The nozzle hole 18 is sealed by using the nozzle touch mechanism of the injection unit. Specifically, the nozzle 14 is advanced by means of the nozzle touch mechanism, so that the tip of the nozzle 14 comes into contact with the nozzle sealing surface 30 of the nozzle sealing body 16. Further, the nozzle sealing body 16 is pushed forward while compressing the spring 33, which brings the supporting surface 32 at the front end into contact with the mold clamping unit member 31. At this point, the nozzle hole 18 is completely blocked.

To release the above-described blocking, the nozzle 14 is retracted by operating the nozzle touch mechanism again. Accordingly, the nozzle sealing body 16 of the nozzle hole sealing device 10 is pushed back to the original position by the spring 33. The resin for purging is discharged in this condition.

In this embodiment, the resin pressure is sustained by the mold clamping unit member 31 via the nozzle sealing body 16 when the nozzle hole 18 is blocked. Therefore, the force acting on the arm 8 of the robot 3 is only the reaction force of the spring 33, so that the load on the robot arm 8 is extremely low. The spring 33 may be replaced with an actuator or the like. In FIG. 13, a resin receiver 34 is detachably mounted under the body 29 of the nozzle hole sealing device 10 to receive the purged resin.

Figure 14:
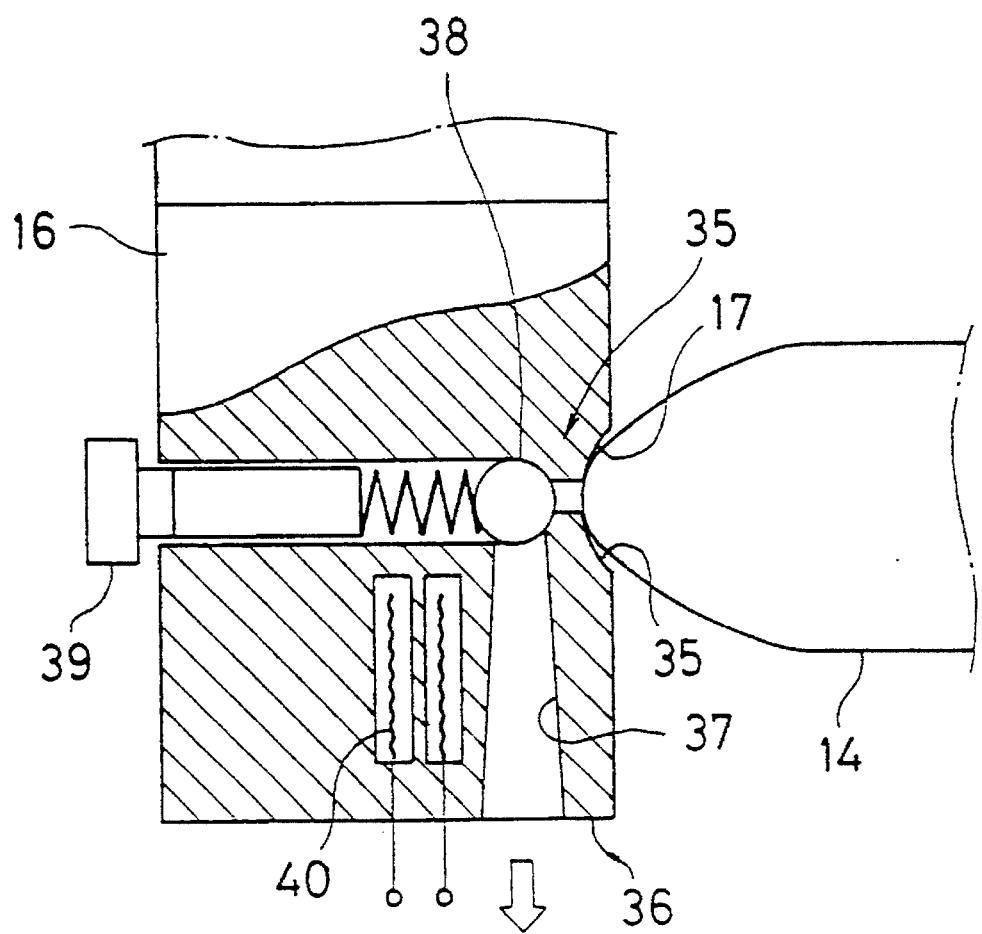
FIG. 14 is a front view, partially in cross section, of a main part of the nozzle hole sealing device in accordance with the eighth embodiment of the present invention.

FIG. 14 shows the eighth embodiment of the present invention. The nozzle hole sealing device 10 of this embodiment is provided with a resin passage 37, which runs from a nozzle tip contact area 35 of the nozzle sealing body 16 having a concave configuration including a purged resin discharge surface 36. A constant pressure open valve 38 has a construction similar to that of what we call a relief valve, comprising a ball, a spring, and a pressure regulating screw 39. This valve is regulated to open when the pressure of resin from the nozzle 14 has come to exceed the pressure at the time of measurement (100–500 kg/cm$^2$). Reference numeral 40 in FIG. 14 denotes a heater for heat reserving of the resin passage.

The construction of the nozzle sealing body 16 of this embodiment is also applicable to the cases of the first and seventh embodiments. In applying this to the first embodiment, however, the rigidity of the arm 8 needs to be increased to withstand a high pressure to act thereon when the purged resin is discharged.

As in the case of the eighth embodiment, when the resin passage 37 including the constant pressure open value 38 is formed in the nozzle hole sealing body 16, in performing the purging operation using the nozzle hole sealing device 10 after the nozzle hole 18 is blocked or after performing the measuring operation with the constant pressure open value 38 kept closed, the resin can be discharged without separating the nozzle hole sealing device 10 from the nozzle, so that the purging efficiency can be improved.

We claim:

1. A nozzle hole sealing tool device adapted to be mounted to a wrist of a robot via a tool changer, for sealing a hole of an injection nozzle on a heating cylinder, comprising:

a nozzle sealing body connected to said tool changer via a buffering member made of an elastic material; and a nozzle contact area formed on one side of said nozzle sealing body, to seal a hole of an injection nozzle disposed on a distal end of a heating cylinder when said nozzle contact area of said nozzle sealing body presses against said injection nozzle.

2. A nozzle hole sealing tool device for an injection nozzle according to claim 1, wherein said nozzle contact area formed on said nozzle sealing body includes a concave portion having a roundness with a slightly larger radius of curvature than that of a roundness of the nozzle tip covering the portion which comes in contact with the nozzle hole.

3. A nozzle hole sealing tool device for an injection nozzle according to claim 1, wherein said nozzle sealing body is made of a heat-resistant rigid plastic.

4. A nozzle hole sealing tool device adapted to be mounted to a wrist of a robot via a tool changer, for sealing a hole of an injection nozzle on a heating cylinder, comprising:

a nozzle sealing body attachable to said robot wrist;

a nozzle contact area formed on one side of said nozzle sealing body, to seal a hole of an injection nozzle disposed on a distal end of a heating cylinder when said nozzle contact area of said nozzle sealing body presses against said injection nozzle;

a groove formed on an outer surface of one of said injection nozzle and said heating cylinder; and an engagement mechanism, attached to said nozzle sealing body, to engage said nozzle sealing body with said groove formed on said outer surface of one of said injection nozzle and said heating cylinder.

5. A nozzle hole sealing tool device according to claim 4, wherein said engagement mechanism includes a plurality of chuck claws which open and close to respectively release from and engage with said groove.

6. A nozzle hole sealing tool device according to claim 4, wherein said groove has a concave configuration.

7. A nozzle hole sealing tool device according to claim 4, wherein said groove has a convex configuration.

8. A nozzle hole sealing tool device adapted to be mounted to a wrist of a robot via a tool changer, for sealing a hole of an injection nozzle on a heating cylinder, comprising:

a shaft member attachable to said robot wrist;

a flat-board shaped nozzle sealing body integrally connected to one end portion of said shaft member, extending in an axial direction of said shaft member and including a nozzle contact area formed on an inner surface of said nozzle sealing body;

a guide body integrally connected to an opposite end portion of said shaft member to form a gap between a longitudinal direction of said guide body and said nozzle sealing body, said gap becoming wider toward a distal end of said nozzle sealing body and an opposite distal end of said guiding body, said guide body including a recess for receiving one of an injection nozzle and a heating cylinder; and a guide flange formed on an outer surface of said one of said injection nozzle and said heating cylinder, and having an inclined surface transverse to said axial direction of said shaft member to be received in said recess when said shaft member moves toward said heating cylinder in said direction to seal a hole of said injection nozzle disposed on a distal end of said heating cylinder at said nozzle contact area of said inner surface of said nozzle sealing body.

9. A nozzle hole sealing tool device for an injection nozzle according to claim 8, further comprising a heat reserving heater disposed inside said nozzle sealing body in the vicinity of said nozzle contact area formed on said nozzle sealing body.

10. A nozzle hole sealing tool device for an injection nozzle according to claim 8, wherein said nozzle sealing body is provided with a resin passage formed therein with an inlet port located in a part of the nozzle contact area on one side surface of the nozzle sealing body and a discharge outlet located on the lower end surface of the same body.

11. A nozzle hole sealing tool device for an injection nozzle according to claim 10, wherein a constant pressure open valve is disposed inside said nozzle sealing body and also in the middle of said resin passage.

12. A nozzle hole sealing tool device for an injection nozzle according to claim 10, wherein a heater for heating said resin passage is disposed inside said nozzle sealing body.

13. A nozzle hole sealing tool device adapted to be mounted to a wrist of a robot via a tool changer, for sealing a hole of an injection nozzle disposed on a distal end of said heating cylinder, comprising:

a shaft member attachable to said robot wrist;

a flat-board shaped nozzle sealing body integrally connected to one end portion of said shaft member, extending in an axial direction of said shaft member and including a nozzle contact area formed on an inner surface of said nozzle sealing body;

a pair of gripping jaws connected to an opposite end portion of said shaft member to form a gap between a longitudinal direction of said pair of gripping jaws and said nozzle sealing body, said pair of gripping jaws moving between an open and closed position; and a guide flange formed on an outer surface of one of said injection nozzle and said heating cylinder, and having a predetermined width and a surface inclined in a direction of said width, said pair of gripping jaws moving in an axial direction toward said heating cylinder with said pair of gripping jaws in said open position to ultimately grasp said guide flange with said pair of gripping jaws in said closed position contacting said nozzle contact area thereby pressing against a hole in a tip of said nozzle to seal said hole.

14. A nozzle hole sealing tool device adapted to be mounted to a wrist of a robot via a tool changer, for sealing a hole of an injection nozzle on a heating cylinder, comprising:

a cylindrical nozzle contact area including a plurality of internal threads, said cylindrical nozzle sealing body being pivotally supported and rotated by a robot tool mounted on said wrist of said robot;

a nozzle of a heating cylinder in an injection molding machine including a plurality of external threads for engagement with said internal threads in said nozzle contact area of said nozzle sealing body; and means for rotating said cylindrical nozzle contact area engage said external threads of said nozzle, thereby sealing a hole at a tip of said nozzle with said nozzle contact area.

15. A nozzle hole sealing tool device adapted to be mounted to a wrist of a robot via a tool changer, for sealing a hole of an injection nozzle on a heating cylinder, comprising:

a robot tool body mounted on said wrist of said robot;

a nozzle sealing body slidably passing through an aperture in said robot tool body, said nozzle seal body including: (1) a sealing portion at one end, said sealing portion having a nozzle contact surface formed on an outer surface of said nozzle sealing body to seal a hole in a tip of said nozzle, (2) a contact member at an opposite end of said nozzle sealing body, to contact a stationary clamping unit, and (3) a spring disposed between said robot tool body and said sealing portion to compress while said nozzle contact surface of said sealing portion of said nozzle sealing body moves to engage said nozzle at a position where said contact member contacts said stationary clamping unit, said nozzle contact surface thereby sealing said hole of said nozzle.

16. A nozzle hole sealing tool device adapted to be mounted to a wrist of a robot via a tool changer, for sealing a hole of an injection nozzle on a heating cylinder, comprising:

a nozzle sealing body attachable to said robot wrist;

a nozzle contact area formed on one side of said nozzle sealing body, to seal a hole of an injection nozzle disposed on a distal end of a heating cylinder when said nozzle contact area of said nozzle sealing body presses against said injection nozzle; and a resin receiver connected to said nozzle sealing body to receive purged resin discharged from said hole of said injection nozzle.

* * * * *

UNITED STATES PATENT AND TRADEMARK OFFICE
CERTIFICATE OF CORRECTION

PATENT NO. : 5,505,606
DATED : April 9, 1996
INVENTOR(S) : Susumu ITO, et al.

It is certified that error appears in the above-indentified patent and that said Letters Patent is hereby corrected as shown below:

Column 6, line 2, after "plurality" delete "10";
       line 8, change "2" to --3--.

Column 7, line 8, change "28" (first and second occurrence) to --26--;
       line 12, change "28" to --26--;
       line 31, after "and" delete "is";
       line 53, after "a" delete "with, whose" and insert --whole, with--.

Column 10, line 32 Please delete claim 14, in its entirety and insert claim 14, as shown below.

A nozzle hole sealing tool device adapted to be mounted to a wrist of a robot via a tool changer, for sealing a hole of an injection nozzle on a heating cylinder, comprising:

a cylindrical nozzle sealing body attachable to [a] said robot wrist and including a nozzle contact area formed within a bottom portion of said cylindrical nozzle sealing body, said nozzle contact area including a plurality of internal threads, said cylindrical nozzle sealing body being pivotally supported and rotated by a robot tool mounted on said wrist of said robot;

a nozzle of a heating cylinder in an injection molding machine including a plurality of external threads for engagement with said internal threads in said nozzle contact area of said nozzle sealing body; and

UNITED STATES PATENT AND TRADEMARK OFFICE
CERTIFICATE OF CORRECTION

PATENT NO. : 5,505,606
DATED : April 9, 1996
INVENTOR(S) : Susumu ITO, et al.

It is certified that error appears in the above-identified patent and that said Letters Patent is hereby corrected as shown below:

means for rotating said cylindrical nozzle sealing body as said robot tool moves toward said nozzle in an axial direction of said nozzle sealing body to a position where said internal threads of said nozzle contact area engage said external threads of said nozzle, thereby sealing a hole at a tip of said nozzle with said nozzle contact area.

Signed and Sealed this

Fifteenth Day of April, 1997

*Attest:*

BRUCE LEHMAN

*Attesting Officer*     *Commissioner of Patents and Trademarks*